United States Patent
Brown et al.

(10) Patent No.: US 7,469,735 B2
(45) Date of Patent: Dec. 30, 2008

(54) COMPOSITE STRUCTURAL ELEMENT FABRICATING DEVICE AND METHOD

(75) Inventors: Todd A. Brown, Olympia, WA (US); Darrell D. Jones, Mill Creek, WA (US); Andrew E. Modin, Enumclaw, WA (US)

(73) Assignee: The Boeing Corporation, Chicago, IL (US)

( * ) Notice: Subject to any disclaimer, the term of this patent is extended or adjusted under 35 U.S.C. 154(b) by 498 days.

(21) Appl. No.: 11/195,786

(22) Filed: Aug. 3, 2005

(65) Prior Publication Data

US 2007/0029038 A1    Feb. 8, 2007

(51) Int. Cl.
*B65H 81/00* (2006.01)
(52) U.S. Cl. .................. 156/392; 156/433; 156/441
(58) Field of Classification Search .................. 156/392, 156/433, 441, 425, 428–430
See application file for complete search history.

(56) References Cited

U.S. PATENT DOCUMENTS

| | | | |
|---|---|---|---|
| 3,259,021 A | 7/1966 | Appleton et al. | |
| 4,707,214 A * | 11/1987 | Nithart et al. | 156/392 |
| 4,720,255 A * | 1/1988 | Mittelstadt | 425/394 |
| 4,726,924 A * | 2/1988 | Mittelstadt | 264/257 |
| 4,867,834 A | 9/1989 | Alenskis et al. | |
| 7,134,629 B2 | 11/2006 | Johnson et al. | |

FOREIGN PATENT DOCUMENTS

| | | | |
|---|---|---|---|
| JP | 2003-317547 A | * | 11/2003 |
| WO | WO 99/22932 | | 5/1999 |
| WO | WO 2005/011961 A1 | | 2/2005 |

* cited by examiner

*Primary Examiner*—Jeff H Aftergut
(74) *Attorney, Agent, or Firm*—Baker Hostetler LLP

(57) ABSTRACT

To fabricate a composite item, a device places a composite ply on a curved form at about 0° relative to a longitudinal axis of the form. The form includes a web surface and a cap surface. The device includes a web compaction roller and a set of guides. The web compaction roller compacts a composite material upon the web surface and generate a web ply. The set of guide rollers urges against the cap surface. The compaction roller is directed along the form by the guide rollers.

15 Claims, 7 Drawing Sheets

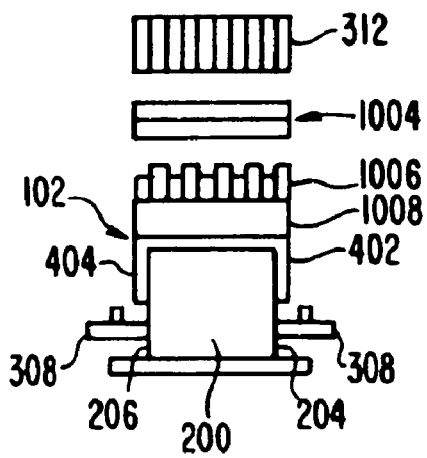
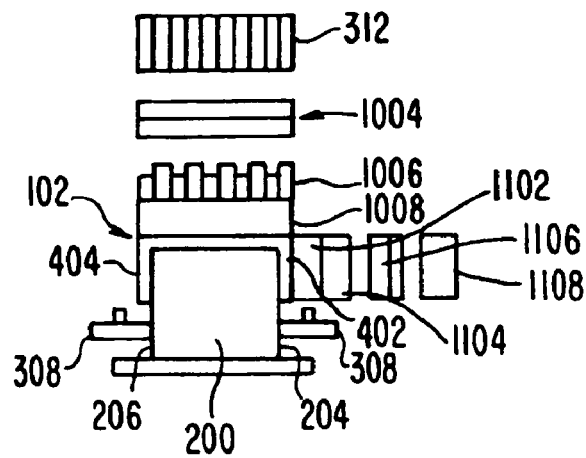
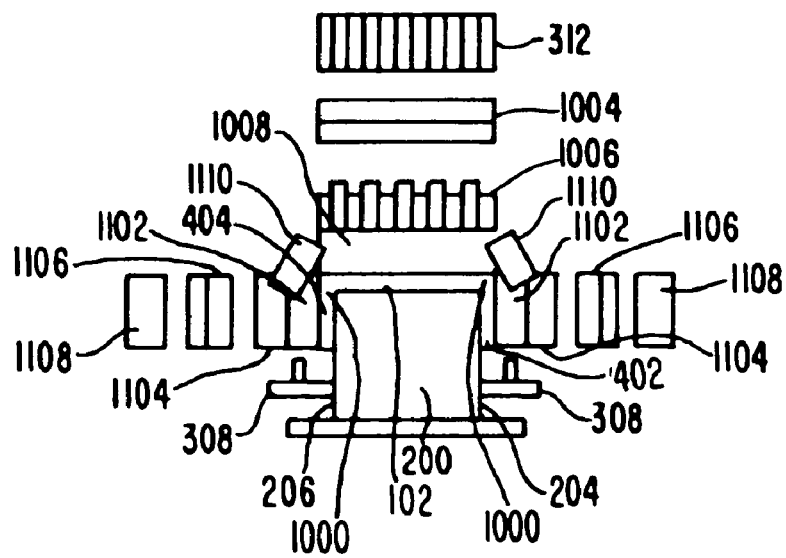

COMPOSITE STRUCTURAL ELEMENT FABRICATING DEVICE AND METHOD

FIELD OF THE INVENTION

The present disclosure relates generally to composite structures. More particularly, the present disclosure relates to a device and method of fabricating contoured structural elements from composite materials.

BACKGROUND OF THE INVENTION

Composite materials have been used increasingly in a variety of industries, including the automotive, marine and aerospace industries. Composite materials have been used to produce nonload-carrying structures, such as boat hulls or automobile body panels. Composite materials have also been applied in the manufacture of load-carrying structures, such as pressure vessels and aircraft fuselages.

Composite materials especially have application in the design of load bearing structural members. Composite materials used in these designs include strong fibrous materials, such as carbon, aramid, glass or quartz, bonded together with a resin material, such as an epoxy. Such materials can have the advantage of a high tensile strength to weight ratio, permitting the design of lightweight structures having substantial strength in tension. Since the load in these materials is carried primarily by the fibers, a variety of composite materials have been developed with unidirectional fibers, that is, the fibers are substantially aligned in a uniform direction. Thus, these materials are frequently used in designs that place the fibers along the direction of the tensile load in a structural member.

However, the composite material designs can have the disadvantage that the unidirectional fibers do not follow the contour of the structural member. For example, in a structural element that includes a surface that is curved within a plane, the composite material can be trimmed to the shape of the planar arc, but the fibers do not follow the curve of the arc. In such a design, the orientation of the unidirectional fibers does not lie in the direction of loading in the structural member. Furthermore, the unidirectional fibers are severed along the trimmed edge of the curve.

Accordingly, it is desirable to provide a method of manufacturing curved composite structural elements with load-bearing fibers aligned along the curvature of the structural element.

SUMMARY OF THE INVENTION

The foregoing needs are met, to a great extent, by the present invention, wherein in one aspect a method is provided that in some embodiments permits the semi-automated manufacture of curved composite structural elements with load-bearing fibers aligned along the curvature of the structural element using a combination of fiber placement and manual or automated layup processes.

An embodiment of the present invention relates to a device to place a composite ply on a curved form at about 0° relative to a longitudinal axis of the form. The form includes a web surface and a cap surface. The device includes a web compaction roller and a set of guides. The web compaction roller compacts a composite material upon the web surface and generate a web ply. The set of guide rollers urges against the cap surface. The compaction roller is directed along the form by the guide rollers.

Another embodiment of the present invention pertains to an apparatus to fabricate a composite curved ply. The apparatus includes a means for guiding, means for placing, and means for compacting. The means for guiding directs a tow placement device along a cap surface of a form. The means for placing places a plurality of contiguously adjoined strips of a composite material in the shape of a planar arc to form a web ply upon a web surface of the form. The composite material includes a plurality of fibers comprising a general fiber orientation and the fiber orientation of each of the strips is substantially aligned along the full length of the planar arc. The means for compacting compacts the web ply.

Yet another embodiment of the present invention relates to a method of fabricating a composite curved ply. In this method, a tow placement device is guided along a form with a set of rollers that urge against a cap surface of the form. In addition, a plurality of contiguously adjoined strips of a composite material are placed in the shape of a planar arc to form a web ply upon a web surface of the form. The composite material includes a plurality of fibers comprising a general fiber orientation and the fiber orientation of each of the strips is substantially aligned along the full length of the planar arc. Furthermore, the web ply is compacted.

There has thus been outlined, rather broadly, certain embodiments of the invention in order that the detailed description thereof herein may be better understood, and in order that the contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 11A is a simplified view illustrating a device to place the layup of a 0° web ply of a composite material according to an embodiment of the invention.

FIG. 11B is a simplified view illustrating a device to place the layup of a 0° web and cap ply of a composite material according to an embodiment of the invention.

FIG. 11C is a simplified view illustrating a device to place the layup of a 0° web and cap ply and place and/or compress a ply along a radii of a structural element according to an embodiment of the invention.

DETAILED DESCRIPTION

An embodiment in accordance with the present disclosure provides a device for manufacturing curved composite structural elements. The device is configured to place a ply on a form or manufacturing tool for a curved composite web such that the fiber orientation of the composite material is substantially aligned with the curvature of the structural element.

In addition or alternatively to placing a ply on the web, the device is configured to place a ply on the form or manufacturing tool for a curved composite flange or cap such that the fiber orientation of the composite material is substantially aligned with the centerline and/or edge of the structural element.

In the following disclosure, the composite structural element is first illustrated and described to give an example of a suitable context for an embodiment of the invention. However, other composite items are readily suitable for the various embodiments. For example, straight, compound curves, multi-axis curves, and the like are within the scope of the various embodiments.

Figure 1A:
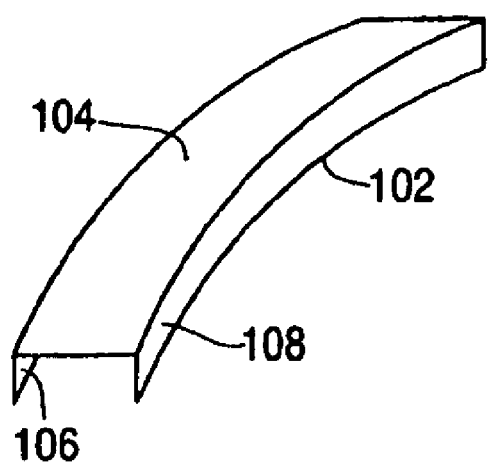
FIG. 1A is a perspective view illustrating a curved structural element with a "C"-shaped cross section.
Figure 1B:
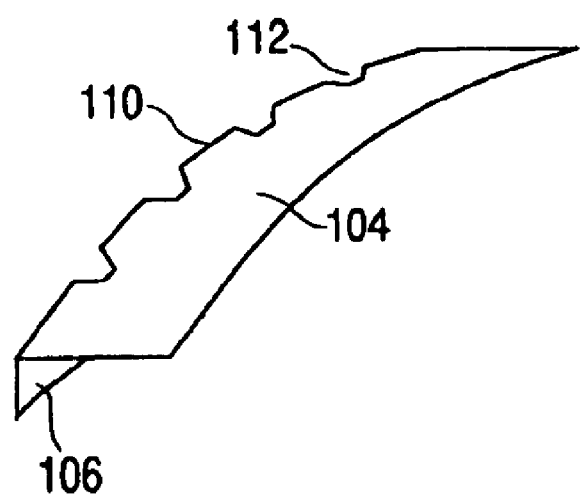
FIG. 1B is a perspective view illustrating a curved structural element with an "L"-shaped cross section.

An embodiment will now be described with reference to the drawing figures, in which like reference numerals refer to like parts throughout. An example of a composite structural element 102 with a curved planar surface, or web surface, 104 and two side, or cap, surfaces 106, 108 forming a "C"-shaped cross section that may be produced by a method of an embodiment is shown in FIG. 1A. Similarly, FIG. 1B shows an example of a composite structural element 110 with a curved planar surface, or web surface, 104 and one flange, side or cap surface 106, including several cutaways, or "mouse holes," 112 that may be produced using a method of an embodiment of the present disclosure. These two examples of structural elements 102, 110 correspond to an embodiment of a first frame section, or shear tie 110, and an embodiment of a second frame section, or floating frame 102, used as structural support elements in an aircraft fuselage. Examples of these components are found in copending U.S. patent applications, Ser. No. 10/851,381, Biornstad et al., "Composite Barrel Sections for Aircraft Fuselages and other Structures, and Methods and Systems for Manufacturing such Barrel Sections," filed May 20, 2004, and Ser. No. 10/853,075, Johnson et al., "Structural Panels for Use in Aircraft Fuselages and other Structures," filed May 25, 2004, the disclosures of which are hereby incorporated by reference in their entirety.

However, alternative embodiments of this disclosure may be used to produce any compatible load carrying element, including stiffeners, beams and frames, such as those used in pressure vessels, other composite containers, boats, trains, submersibles, arches, buildings, bridges, seismic upgrades, window frames or door frames.

In an embodiment of the present disclosure, structural elements are manufactured from a composite material, for example, a polymer matrix, epoxy, BMI or a polyester thermosetting plastic, such as PEEK, PEKK, or PPS reinforced with fibers, such as carbon, aramid, glass, Kevlar, boron, Hybor or quartz, possibly intermixed with metal, metal foil, such as TiGr, or fiber metal laminate. These composite materials generally are "cured" into a stronger form through an endothermic chemical reaction, which requires the addition of energy, for example, by way of heating or irradiation. Examples of composite materials used in various embodiments of this disclosure include graphite fiber reinforced epoxy, fiber reinforced plastic (FRP), glass-fiber reinforced plastic (GRP), carbon-fiber reinforced plastic (CRP), metal matrix composites (MMC), and reinforced carbon-carbon (carbon fiber in a graphite matrix).

Figure 2:
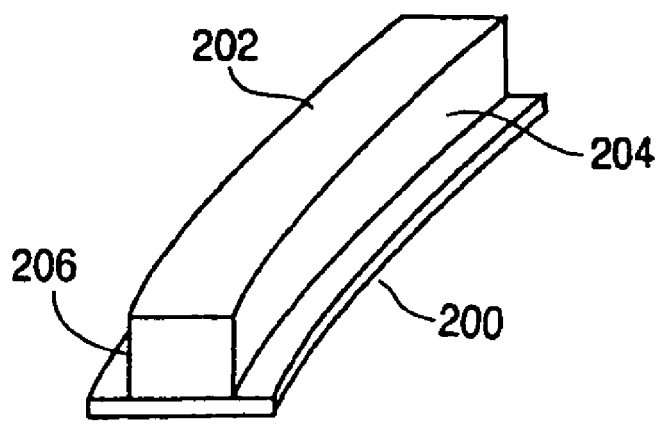
FIG. 2 is a perspective view illustrating a manufacturing tool, or mandrel, in accordance with an embodiment of the invention.

An embodiment may include a hand, or manual, layup process, or an automated layup process, wherein a composite material, such as a composite fabric or a composite tape, is placed on a form, mandrel, or manufacturing tool. An example of a manufacturing tool, or mandrel 200, is illustrated in FIG. 2. The mandrel 200 may include a web surface 202, which corresponds to the curved planar surface 104 of the structural element 102, 110 shown in FIG. 1A and FIG. 1B. The mandrel 200 may further include an inner side, or cap, surface 204; an outer side, or cap, surface 206; or both inner and outer side, or cap, surfaces 204, 206. In other embodiments, the mandrel 200 may include a near-endless combination of other surfaces.

An embodiment may include a fiber placement device. Another embodiment may include a method of placing plies, in which fiber placement device may be used to fabricate a curved web and/or cap ply of a structural element. The fiber placement process typically involves the placement of multiple "tows" (that is, untwisted bundles of continuous filaments, such as carbon or graphite fibers, pre-impregnated with a thermoset resin material such as an epoxy commonly known as "prepreg tow") or slit composite tape ("slit tape") onto a manufacturing tool, or mandrel. Conventional fiber placement machines dispense multiple tows to a movable payoff head that collimates the tows (that is, renders the tows parallel) and applies the tows to a mandrel surface using one or more compaction rollers that compress the tows against the surface. A typical tow is between about 0.12 inch to about 0.50 inch wide when flattened. In addition, such machines typically include means for dispensing, clamping, cutting and restarting individual tows during placement. However, such conventional machines are extremely complicated, expensive, and time consuming to operate.

Slit tape is a composite tape that has been slit after being produced in standard widths by the manufacturer. Slitting the tape results in narrower widths that allow enhanced maneuverability and tailoring during application in order to achieve producibility and design objectives. For example, in a particular embodiment, a 12-inch wide tape is cut into ninety-six even slits of ⅛ inch each. Generally, slit tape may have widths varying from about 0.12 inch up to about six inches, and may or may not include backing paper.

Figure 3:
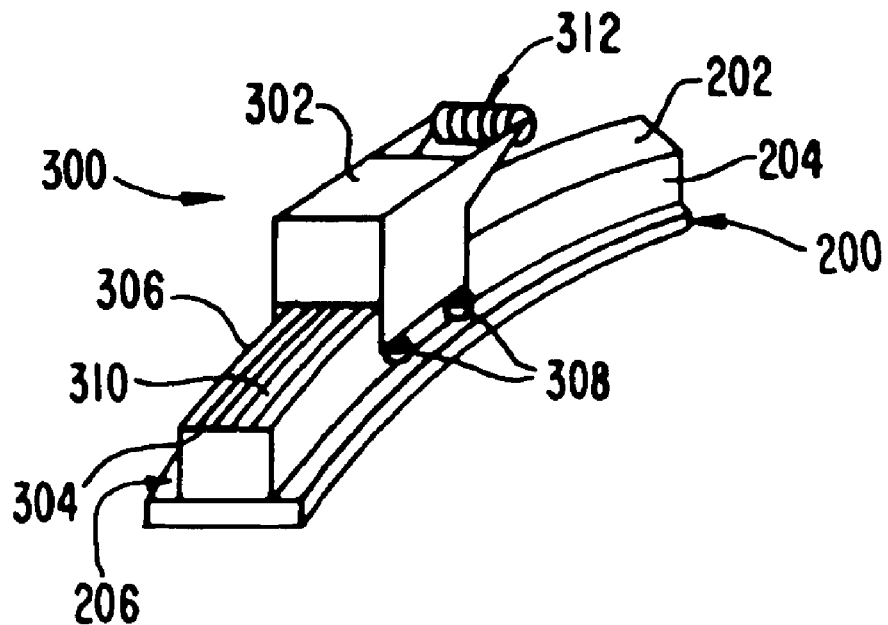
FIG. 3 is a perspective view illustrating a fabrication and layup process of a 0° web ply of a composite material according to an embodiment of the invention.

An embodiment of a fiber placement process 300 according to the present disclosure is illustrated in FIG. 3. In this embodiment, a tow placement device 302 may lay essentially contiguously adjoined strips 304 of a suitable composite material. Examples of suitable composite material include, for example, foil, film slit tape, prepreg tow, and the like. In a particular embodiment, the strips are placed in a planar arc 306 that corresponds to the shape of the web surface 202. As a result, the strips and/or fibers of the slit tape or tow are oriented in alignment with the longitudinal centerline of the arc along the full length of the curve substantially without distortion of the fibers, such as wrinkles. In a particular embodiment, the curved structural element includes the shape of a planar arc with uniform radius. Nevertheless, other embodiments include essentially straight structural elements, or elements with a curvature of nonuniform radius, and/or a complex contour that does not lie in a plane. In an alternative embodiment, the tow placement device 302 may place multiple plies, one over another, creating a thicker grade ply.

Various processes may also include a web ply trimming process, in which a web ply may be trimmed to remove excess composite and substrate material from the edges of the web ply. For example, in an embodiment of a web ply trimming process, a user, such as a technician or engineer, or a numerically-controlled ply cutting machine may cut a web ply to conform to the shape of a perimeter of a possibly curved web surface of a mandrel or other similar manufacturing tool, such as the web surface 202.

In operation, the tow placement device 302 may be utilized to place a web and/or cap ply upon the mandrel 200. For example, the tow placement device 302 is urged to move along the mandrel 200, guided by a set of rollers 308 that engage one or both of the inner and outer side caps 204 and 206, to place a web ply 310. The strips 304 that make up the web ply 310 may be drawn from a material source such as a creel or spool 312. As the strips 304 are drawn into the tow placement device 302, they may pass through a comb, tensioning systems, and may be consolidated upon the mandrel 200 by a roller as described in greater detail herein.

The tow placement device 302 may be urged to advance along the mandrel 200 in any suitable manner. For example, the tow placement device 302 may include an actuator or other such drive mechanism. In addition, the tow placement device 302 may be advanced by a user. The web ply 310 may be oriented on the curved web surface 202 of the mandrel such that the composite fibers are aligned with the centerline of the curved surface along the full length of the arc. The web ply 310 is generally referred to as a 0° ply, a naming convention referencing the angle of the fibers with respect to the centerline of the surface. In an alternative embodiment, the web ply 310 may be laid up over a previous ply, which may be a 0°, ±45°, 90°, or another type of ply, on the mandrel 200.

Figure 4:
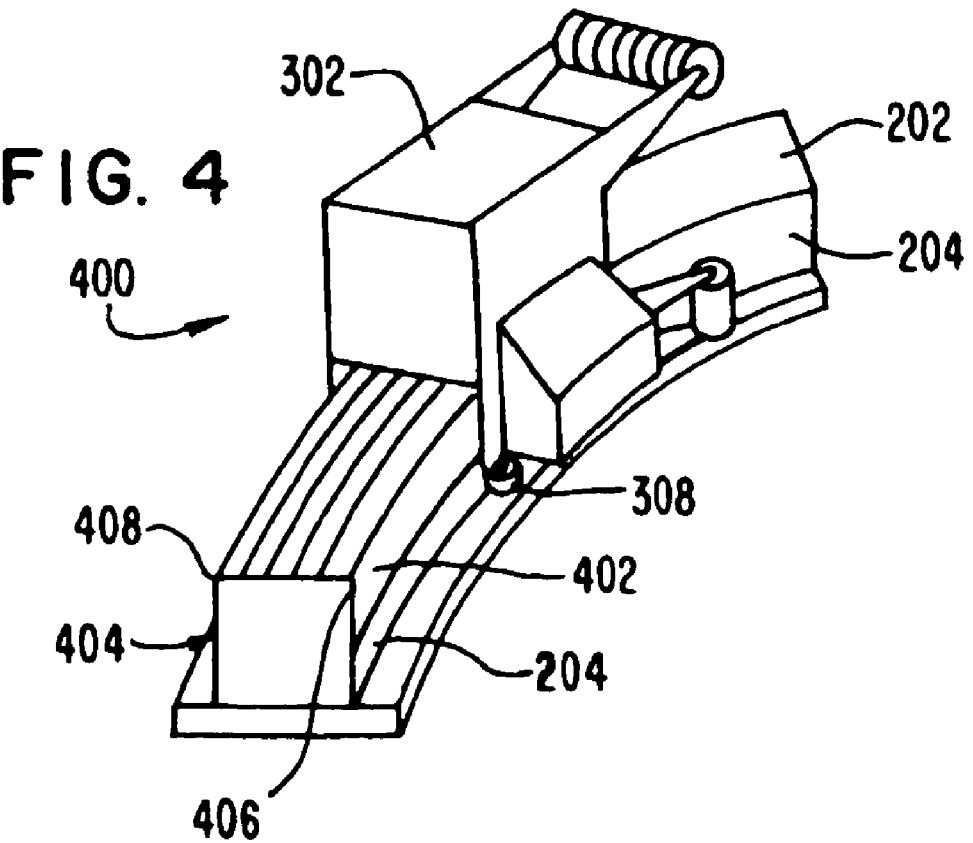
FIG. 4 is a perspective view illustrating the layup of a 0° cap ply of a composite material according to an embodiment of the invention.

In another embodiment, a cap ply is placed by the tow placement device 302 on the mandrel 200 (or other manufacturing tool), utilizing a cap ply layup process 400. FIG. 4 depicts an example of the cap ply layup process 400 according to the present disclosure. In this example, a cap ply 402 may be laid up on the mandrel 200. The cap ply 402 may include a composite tape, for example, approximately two inches wide, and may be placed on the mandrel 200 such that the orientation of the tape fibers runs in a lengthwise, or substantially 0°, direction along the cap surface 206. As further shown in FIG. 4, a single cap ply 402 or 404 may be laid up on one side of the mandrel 200 in order to form an "L"-shaped cross section with a single flange, such as that of the example of a structural element in FIG. 1B, and a second cap ply 404 or 402 may be applied to the opposite side of the mandrel 200 in order to form a "C"-shaped cross section with two flanges, such as that of the structural element in FIG. 1A.

In the case of either or both cap plies 402 and 404 splices 406 and 408 may be formed along the corner of the mandrel 200 where the cap ply 402 and 404 meets the web ply 310. In this way, the cap ply or plies 402 and 404 and the web ply form a continuous, substantially 0° ply across the web surface 202 and one or both cap surfaces 106 and 108. Since the splices 406 and 408 do not interrupt the 0° fibers along the length of the web and cap surfaces, which are designed to carry tensile loads in the longitudinal direction of the web and cap surfaces, the splices 406, 408 do not affect the load-bearing capacity of the structural elements 102 and 110. An alternative embodiment may include 020 cap plies 402 and 404, without a 0° web ply 310.

Figure 5:
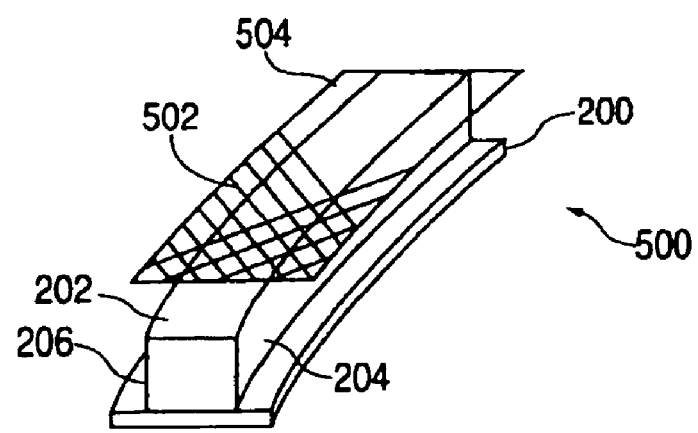
FIG. 5 is a perspective view of the layup of a 45° diagonal ply of a composite material on a manufacturing tool.

In yet another embodiment of the present disclosure, a diagonal ply layup process 500 wherein a diagonal ply may be manually or automatically placed on a mandrel is depicted in FIG. 5. In this example, a diagonal ply 502 may be placed on the mandrel 200 so that the fibers are oriented on the bias at approximately positive (+) and negative (−) 45° from the centerline of the web surface of the mandrel 200. The composite fabric 504 in an embodiment is a prepreg composite fabric pre-impregnated with a resin. However, in other embodiments, the composite fabric 504 may include any suitable type of composite fabric, including a dry form composite fabric. Although the diagonal ply shown in FIG. 5 includes a sheet of composite fabric 504, an alternative embodiment may include a diagonal ply formed from strips of composite tape laid up on the mandrel 200 so that the tape fibers are oriented at approximately +45° or −45° from the centerline of the web surface of the mandrel. Furthermore, alternative embodiments may include a diagonal ply with the fibers oriented on a bias at any angle between 0° and 90° from the centerline of the web surface, for example, at positive and negative 60°.

In order to form the flange, side, or cap, surfaces of the structural element, the material of the diagonal ply 502 is cut wider than the web surface 202 of the mandrel 200 so that at least one edge of the diagonal ply 502 may be folded over the side of the mandrel 200. A single edge of the diagonal ply 502 may be folded over the outer cap surface 206 of the mandrel 200 in order to form an "L"-shaped cross section, such as that of the example structural element shown in FIG. 1B. Alternatively, in order to prevent or minimize wrinkling, the diagonal ply 502 may be first placed on the inner cap surface 204 of the mandrel 200 and then folded over the curved web surface 202 by tensioning and uniformly spreading the fibers across the curved web surface 202 to form an "L"-shaped cross section. In addition, the diagonal ply 502 optionally may be folded over the outer cap surface 206 of the mandrel 200, in order to form a "C"-shaped cross section, such as that of the example structural element shown in FIG. 1A. Similarly, the diagonal ply 502 may be first placed on the curved web surface 202 by tensioning and uniformly spreading the fibers across the curved web surface 202 and then folded over the outer cap surface in order to form an "L"-shaped cross section, such as that of the example structural element shown in FIG. 1B.

Figure 6:
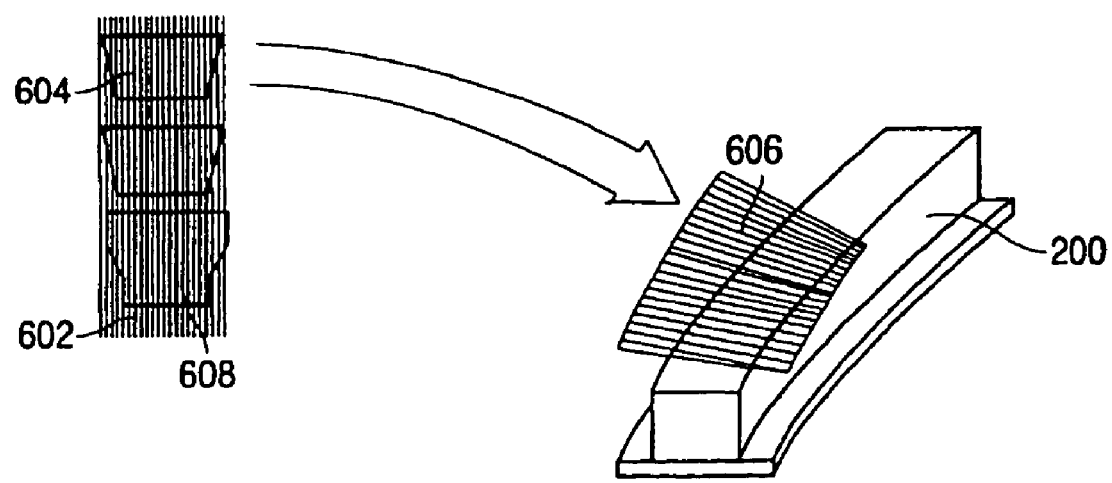
FIG. 6 is a perspective view illustrating the layup of a 90° cross ply of a composite material.

Other embodiments may include a cross ply layup process 600, i.e., a process where a ply is placed in a fashion similar to that shown in FIG. 6. First, a unidirectional composite tape 602 is cut into segments. For example, the tape may be cut into trapezoidal segments 604, as shown in FIG. 6. For the purposes of this disclosure, the term "trapezoidal" is used in the sense of its common meaning in American English, with reference to a quadrilateral having only two sides parallel, as opposed to the common meaning in British English, with reference to a quadrilateral having no two sides parallel. The term commonly used in British English for a quadrilateral having only two sides parallel is "trapezium."

Returning to FIG. 6, the two non-parallel sides of the trapezoidal tape segments 604 may be cut at an angle such that when laid up on the mandrel 200 the two non-parallel edges of the tape segment will be substantially perpendicular to the tangent of the longitudinal centerline of the curved or web surface 202 of the mandrel 200. The tape segments 604 may then be laid up on the mandrel 200 in order to form a cross ply 606 with fibers oriented approximately at a right angle with the centerline of the web surface 202 of the mandrel 200, without forming wrinkles in the tape segments 604.

As in the diagonal ply example described above, the cross ply 606 may be cut wider than the web surface of the mandrel 200 such that one or two edges of the cross ply 606 may be folded over the side or sides of the mandrel 200 in order to form flange, side, or cap, surfaces. In one embodiment, the tape may be cut into modified "funnel" shape segments 608, such that the edge or edges of the tape segment 608 that fold over the cap surfaces 204, 206 of the mandrel 200 have parallel sides and the portion over the web surface 202 of the mandrel 200 has nonparallel sides. In an alternative embodiment, the tape may be cut into rectangular segments and allowed to overlap or to form gaps between the tape segments when laid up on the mandrel 200. Once again, in this way a "C"-shaped cross section or an "L"-shaped cross section may be formed.

Alternatively, in order to prevent or minimize wrinkling, the cross ply 606 may be first placed on the inner cap surface 204 of the mandrel 200 and then folded over the curved web surface 202 by tensioning and uniformly spreading the fibers across the curved web surface 202 in order to form an "L"-shaped cross section. In addition, the cross ply 606 may optionally be folded over the outer cap surface 206 of the mandrel 200, in order to form a "C"-shaped cross section, such as that of the example structural element shown in FIG. 1A. Similarly, the cross ply 606 may be first placed on the curved web surface 202 by tensioning and uniformly spreading the fibers across the curved web surface 202 and then folded over the outer cap surface in order to form an "L"-shaped cross section, such as that of the example structural element shown in FIG. 1B.

Figure 7:
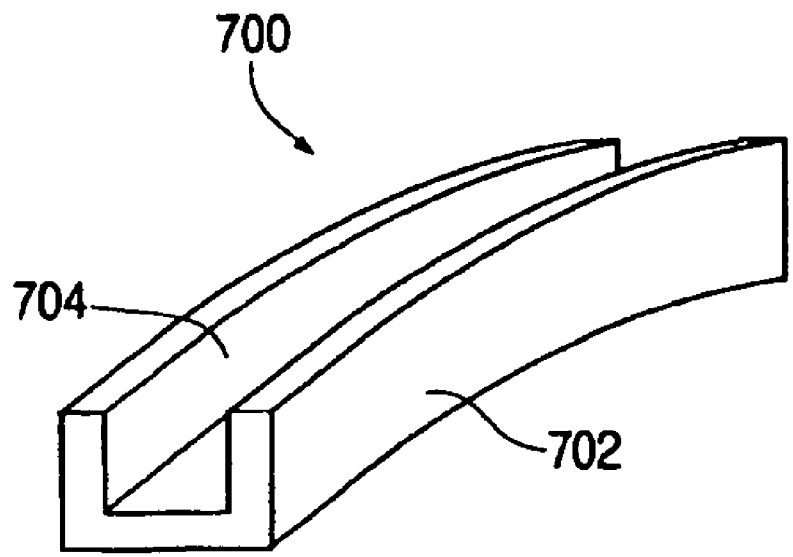
FIG. 7 is a perspective view illustrating an outside mold line (e.g., female) manufacturing tool suitable for layup of a structural element.
Figure 8:
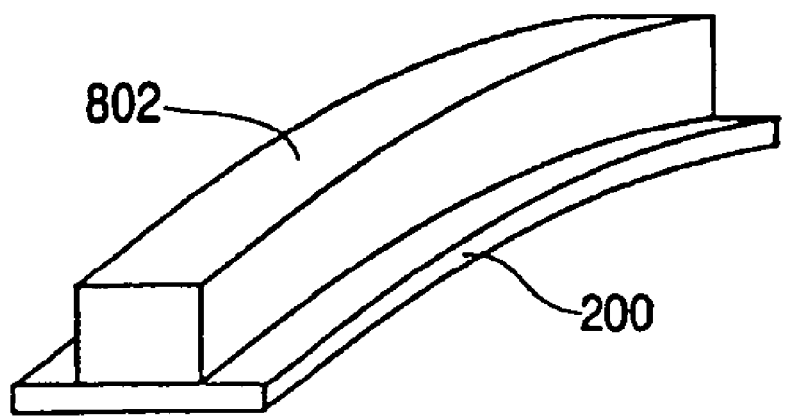
FIG. 8 is a perspective view illustrating an inside mold line (e.g., male) manufacturing tool suitable for enclosure of a structural element layup in a sealed vacuum bag for curing.

In various embodiments of the invention, a structural element may be laid up on and then cured on an inside mold line ("IML") (e.g., male) manufacturing tool similar to the mandrel 200 or the structural element may be laid up on the IML, debulked, transferred to an outside mold line ("OML") (e.g., female) manufacturing tool, as shown in FIG. 7, and cured. In a first embodiment, following layup procedures as described herein, the structural element layup is sealed inside a vacuum bag and a partial vacuum is generated within the vacuum bag in order to remove trapped air from inside and underneath a composite material, between layers of composite plies and between a composite material and a respective mandrel. For example, FIG. 8 is a perspective view illustrating an inside mold line ("IML") (e.g., male) manufacturing tool suitable for enclosure of a structural element layup in a sealed vacuum bag for curing. More specifically, following layup of the composite structural element 102, the mandrel 200 or IML manufacturing tool shown in FIG. 8 is encased within a vacuum bag 802 and a partial vacuum is generated within the vacuum bag 802 to assist in consolidating the various layers of the composite structural element 102.

In an alternative embodiment illustrated in FIG. 7, the structural element is laid up on the IML, debulked, transferred to the OML manufacturing tool 702, and cured. For example, in a transfer process 700, a structural element is laid up on the mandrel 200 and encased in the vacuum bag 802. A partial vacuum is generated within the vacuum bag 802 to draw air out of the layup and further compact the plies. This procedure is typically referred to as, "debulking." The debulked layup is then transferred from the IML to the OML manufacturing tool 702 and cured. Optionally, prior to curing, the laid up structural element and the manufacturing tool 702 may be encased in a vacuum bag 704 and a partial vacuum may be generated within the vacuum bag 704.

Figure 9:
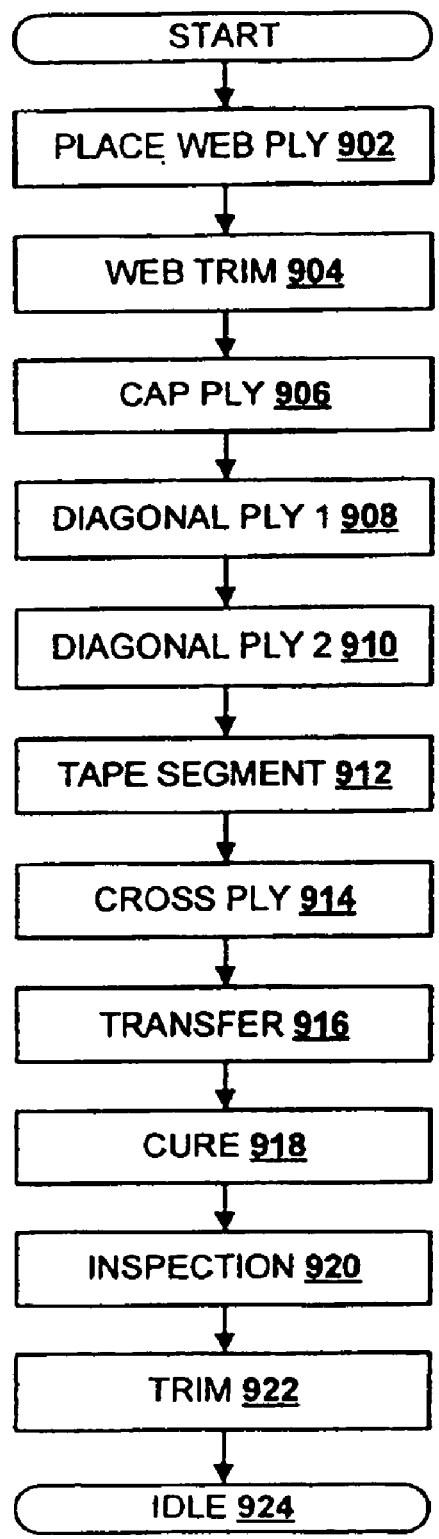
FIG. 9 is a flowchart illustrating steps that may be followed to manufacture a curved composite structural element.

FIG. 9 is a flow diagram outlining a method according to an embodiment for manufacturing a composite structural element. The process may be initiated at step 902 where the tow placement device 302 is utilized to place contiguously adjoined strips of a composite material upon the mandrel 200. As discussed above, in various embodiments the composite material may be in the form of either slit tape or prepreg tow. Additionally, as discussed above, the tow placement device 302 may place the strips in any number of viable or useful shapes, such as the planar arc shown in FIG. 3, with the fibers of the slit tape or tow oriented in alignment with the longitudinal centerline of the arc along the full length of the curve, without distortion of the fibers, such as wrinkles. The web ply may be laid up such that the composite fibers are oriented in a 0° direction aligned with the centerline of the curved web surface of the mandrel 200 along the full length of the arc, such as the web ply shown in FIG. 3. In addition, various embodiments may include more than one web ply in combination with other plies. Furthermore, in an alternative embodiment the tow placement device 302 may place multiple plies, one above another, creating a thicker grade ply.

At step 904, the web ply that was placed by the tow placement device 302 may be trimmed or cut to complete placement of the web ply. For example, a user or numerically-controlled ply cutting machine may cut the web ply at or near the end of the mandrel 200.

At step 906, the tow placement device 302 may be utilized to place the cap ply 402 and/or 404 on the mandrel 200. As discussed above, the cap ply 402 and/or 404 may include composite tape, and may be placed on the mandrel or other tool such that the orientation of the tape fibers runs in a lengthwise, or 0°, direction along the cap surface, such as the cap ply layup shown in FIG. 4. A single cap ply may be laid up on one side of the mandrel or tool in order to form an "L"-shaped cross section with a single flange, such as that of the example structural element shown in FIG. 1B, plus a second cap ply may be applied to the opposite side of the mandrel in order to form a "C"-shaped cross section with two flanges, such as that of the example structural element shown in FIG. 1A, forming a continuous 0° ply across the web surface and one or both cap surfaces. In various embodiments, a cap ply may be laid up directly on the mandrel or other tool, or alternatively, over a previous ply or combination of plies on the mandrel or other tool. In addition, various embodiments may include more than one cap ply in combination with other plies.

At step 908, a ±45° diagonal ply of composite fabric may be manually or automatically laid up on a mandrel, or other similar manufacturing tool, such as that shown in FIG. 2. The diagonal ply may be placed on the mandrel or other tool so that the fabric fibers are oriented at approximately ±45° from the centerline of the web surface of the mandrel or other tool, such as the diagonal ply shown in FIG. 5. As discussed above, in various embodiments the composite fabric may take the form of any suitable composite fabric, including a prepreg composite fabric pre-impregnated with a resin. In various embodiments, a diagonal ply may be laid up directly on the mandrel or other tool, or alternatively, over a previous ply or combination of plies on the mandrel or other tool. In addition, various embodiments may include more than one diagonal ply in combination with other plies.

At step 910, in order to form side, or cap, surfaces of the structural element the composite fabric of the diagonal ply may be cut wider than the web surface of the mandrel or other tool so that at least one edge of each diagonal ply may be folded over the side of the mandrel or other tool. A single edge of the diagonal ply may be folded over one side of the mandrel or other tool in order to form an "L"-shaped cross section, such as that of the example structural element shown in FIG. 1B, or two edges of the diagonal ply may be folded over two sides of the mandrel or other tool in order to form a "C"-shaped cross section, such as that of the example structural element shown in FIG. 1A. Alternatively, in order to prevent or minimize wrinkling of the composite fabric over the inner cap surface of the mandrel, the diagonal ply may be first adhered to the inner cap surface and then folded over the web surface, stretching the composite fabric as necessary to prevent or minimize wrinkling on the cap surface or on the web surfaces. In addition, the diagonal ply may then be folded over the outer cap surface, stretching the composite fabric as required to prevent or minimize wrinkling on the web surface or on the outer cap surface.

At step 912, a unidirectional composite tape may be cut into segments, such as the tape segments shown in FIG. 6.

At step 914, the tape segments may be manually or automatically laid up on a mandrel or other similar manufacturing tool. As discussed above, the fibers of the tape segments may be aligned at substantially 90 degrees with the centerline of the web surface of the mandrel or other tool in order to form a 90° cross ply. In the case of trapezoidal or modified "funnel" shape tape segments, the fibers may be oriented approximately at a right angle with the centerline of the web surface of the mandrel or other tool, without overlapping or creating gaps between the tape segments, and without forming wrinkles in the tape.

As in the case of the diagonal ply above, the cross ply may be cut wider than the web surface of the mandrel or other tool, and one or two edges of the cross ply may be folded over the side or sides of the mandrel or other tool in order to form side or cap surfaces. Once again, in this way a structural element with a "C"-shaped cross section or an "L"-shaped cross section may be formed. In various embodiments, a cross ply may be laid up directly on the mandrel or other tool, or alternatively, over a previous ply or combination of plies on the mandrel or other tool. In addition, various embodiments may include more than one cross ply in combination with other plies.

At step 916, the structural element layup may optionally be transferred to a concave manufacturing tool, e.g., a female mandrel. As discussed above, the concave tool or mandrel may conform to the external surface of the structural element layup, as shown in FIG. 7.

At step 918, the structural element layup may be allowed to cure while sealed inside a vacuum bag on a mandrel or other tool, as shown in FIG. 8, or on a concave tool or mandrel, as shown in FIG. 7. As discussed above, the vacuum may remove trapped air from inside the composite material and from underneath the composite material, between layers of the composite plies and between the composite material and the mandrel.

At step 920, after the structural element layup has cured, it may be inspected to verify compliance with the design specifications. Next, at step 922, the structural element layup may be trimmed, if necessary, to remove any excess material. In addition, cutouts, or "mouse holes," such as those shown in FIG. 1B, may be trimmed into the structural element. Control continues to step 924 where the process idles or stops.

The example embodiment of the flowchart in FIG. 9 described above includes only one web ply, one cap ply, one diagonal ply, and one cross ply. However, other embodiments may include any number of plies in any combination laid up in any order. For example, a floating frame with a "C"-shaped cross section, such as the structural element shown in FIG. 1A, may include eighteen plies on the web surface and twenty-eight plies on each of the two cap surfaces. In this embodiment, the method could include laying up half of the plies in the following order:

45° diagonal ply on the web and both cap surfaces
    a cap ply on each of the two cap surfaces
    an additional cap ply on each of the two cap surfaces
    a web ply on the web surface and a cap ply on the two cap surfaces
    a 45° diagonal ply on the web and cap surfaces
    a cap ply on each of the two cap surfaces
    an additional cap ply on each of the two cap surfaces
    a 45° diagonal ply on the web and cap surfaces
    a cross ply on the web and cap surfaces
    a 45° diagonal ply on the web and the cap surfaces
    a cap ply on each of the two cap surfaces
    a 45° diagonal ply on the web and cap surfaces
    a cross ply on the web surface and on the two cap surfaces
    a 45° diagonal ply on the web and cap surfaces The second half of the plies on the web surface and each of the cap surfaces in this example could then be laid up on the mandrel in the opposite order of the first half to form a mirror image, or symmetrical, layup order, for a total of eighteen plies on the web surface and twenty-eight plies on each of the two cap surfaces.

Another example structural element with a "C"-shaped cross section, such as the structural element 102 shown in FIG. 1A, may include the same ply combination as the previous example, except that the two longitudinal extremes of the web surface each may include an additional ten plies covering the last twelve inches of the web surface at each extreme of the structural element. In this embodiment, two additional diagonal plies may be laid up on the web surface at each extreme of the structural element simultaneously with the two cap plies after the first 45° diagonal ply, and before the first 0° web ply, of the previous example.

In addition, two additional cross plies may be laid up on the web surface at each extreme of the structural element simultaneously with the two cap plies after the second diagonal ply, and before the third diagonal ply, of the previous example. Furthermore, a 0° web ply may be laid up simultaneously with the cap ply before the final three plies of the previous example. Similarly, a symmetrical ply order may be obtained by laying up an additional 0° web ply, two additional cross plies, and two additional diagonal plies in the opposite order between the second half plies of the previous example.

In this last example, each of the additional plies (of the first half of the symmetrical layers) may extend, for example, one half inch farther toward the center of the structural element than the previous. That is, for example, the first additional 45° diagonal ply may extend twelve-and-a-half inches from each end of the structural element layup; the second additional 45° diagonal ply may extend thirteen inches from each end of the layup; the first additional cross ply may extend thirteen and a half inches from each end of the layup; the second additional cross ply may extend fourteen inches from each end of the layup; and the additional web ply may extend fourteen-and-a-half inches from each end of the layup. In order to form a symmetrical, or mirror image, layup order, the five additional plies of the second half of the symmetrical layers each may extend one half inch less than the previous.

As a further example, a shear tie with an "L"-shaped cross section, such as the structural element shown in FIG. 1B may include twenty-four plies. In this embodiment, the method may include laying up half of the plies in the following order:

- a 45° diagonal ply on the web and both cap surfaces
- a cross ply on the web and cap surfaces
- a 45° diagonal ply on the web and cap surfaces
- a web ply on the web surface and a cap ply on the two cap surfaces
- a 45° diagonal ply on the web and the cap surfaces
- a cross ply on the web surface and on the two cap surfaces
- a 45° diagonal ply on the web and the cap surfaces
- a web ply on the web surface and a cap ply on the two cap surfaces
- a 45° diagonal ply on the web and cap surfaces
- a cross ply on the web surface and on the two cap surfaces
- a 45° diagonal ply on the web and cap surfaces
- a web ply on the web surface and a cap ply on the two cap surfaces The second half of the plies in this example may then laid up on the mandrel in the opposite order of the first half to form a mirror image, or symmetrical, layup order, for a total of twenty-four plies on the web surface and on each of the two cap surfaces.

Figure 10:
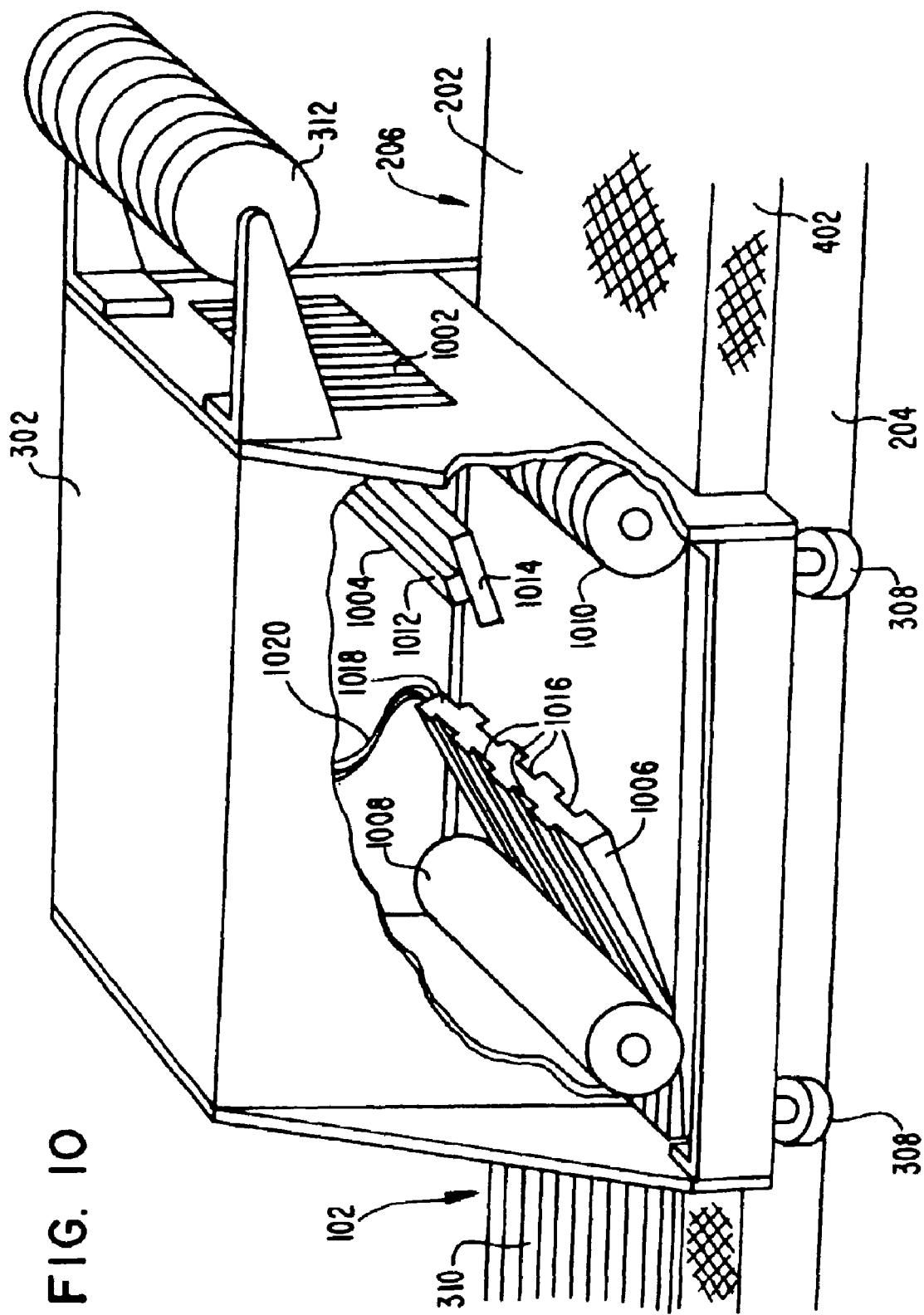
FIG. 10 is a perspective view illustrating a device to place the layup of a 0° web ply of a composite material according to an embodiment of the invention.

FIG. 10 is a cutaway perspective view illustrating the tow placement device 302 utilized to place the 0° web and/or cap ply of a composite material according to an embodiment of the invention. As shown in FIG. 10, the tow placement device 302 includes a comb 1002, tensioning device 1004, tow nosepiece 1006, compaction roller 1008, and rollers 1010. In operation, composite material is fed from the spool 312 with each strip 204 being threaded through a corresponding slot in the comb 1002. The strips 204 are tensioned via any suitable tensioning device. For example, the tensioning device 1004 includes an upper block 1012 and a lower block 1014. The strips 204 may be threaded between the upper block 1012 and the lower block 1014 and a force urging the upper block 1012 and the lower block 1014 together generates a drag tension upon the strips. The upper block 1012 and the lower block 1014 include surfaces that are compatible with any resin included in the strips 204. For example, ultra high molecular weight (UHMW) plastic, Teflon® film, and the like are compatible with some resin systems. In a particular example, the lower block includes a UHMW plastic surface and the upper block 1012 includes a foam backing with a Teflon® film surface.

The tow nosepiece 1006 guides the strips 304 towards the compaction roller 1008. The tow nosepiece 1006 may include a plurality of slots 1016 that correspond to the strips 304. The strips 304 may be interlaced with every other strip 306 being threaded relatively above the nosepiece 1006 in corresponding slots 1016 and the remainder of the strips 304 being threaded relatively below the nosepiece 1006 in corresponding slots 1016. In addition, the tow nosepiece 1006 may optionally include a heating element 1018 powered via a power line 1020. If present, the heating element 1018 may be configured to impart sufficient heat to the strips 304 to improve one or more working characteristics of the strips 304 such as, for example, tackiness, drape, deformability, and the like.

The compaction roller 1008 consolidates the strips 304 upon the web surface 202 (or previously applied web ply 310) to generate the web ply 310. The compaction roller 1008 includes a surface that is compatible with the resin system utilized. The compaction roller 1008 may include a material sufficiently resilient to facilitate consolidation of the strips 304.

As shown in FIG. 10, in an embodiment, the rollers 308 may be disposed to urge against the cap surface 204 somewhat below the cap ply 402. In this regard, as successive cap plies 402 are placed upon the cap surface 204, the dimensions of the composite structural element 102 are altered. By indexing guidance of the tow placement device 302 relative to the cap surface 204, complex systems to accommodate for the altered dimensions may be avoided. In addition, depending upon characteristics of the composite materials, the cap ply 402 may not be sufficiently smooth and/or rigid enough for proper function of the rollers 308. Thus, by having the rollers 308 engage the cap surface 204, these and potentially other issues may be avoided. Optionally, the tow placement device 302 includes another set of the roller 308 to engage and/or urge against the cap surface 206. If present, the rollers 308 configured to engage and/or urge against the cap surface 206 are similar to the rollers 308 configured to engage and/or urge against the cap surface 204.

The rollers 1010 may be configured to substantially maintain the tow placement device 302 at a predetermined height above the web surface 202 or previously placed web ply 310. In a particular example, the rollers 1010 include a plurality of wheels to accommodate for differing linear travel of the inside verses the outside wheels. The rollers 1010 may include any suitable material such as, for example, UHMW, brass, Teflon®, and the like.

FIGS. 11A to 11C are simplified views illustrating various embodiments of the tow placement device 302 configured to place the layup of a 0° web and/or cap ply of a composite material. As shown in FIG. 11B, the tow placement device 302 may include a cap ply compaction roller 1102, cap ply nosepiece 1104, cap ply tensioning device 1106, and cap ply spool 1108.

FIG. 11C is a simplified view illustrating the tow placement device 302 for placing the layup of the 0° web ply 104 and cap plies 402 and 404 and place and/or compress a radii ply 1000 along a radii of the composite structural element 102 according to an embodiment of the invention. As shown in FIG. 11C the tow placement device 302 may include a pair of each of the cap ply compaction roller 1102, cap ply nosepiece 1104, cap ply tensioning device 1106, and cap ply spool 1108.

In addition, the tow placement device 302 may optionally include one or more 45° compaction rollers 1110 to facilitate compaction of the radii ply 1000 at the interface between the web ply 310 and the cap plies 402 and/or 404. This radii ply 1000 may include a radii or chamfer to ease the transition from the web ply 310 to the cap plies 402 and/or 404. The radii ply 1000 may include material from the web ply 310 and the cap plies 402 and/or 404 that extends past the respective surfaces and into the interface area. In addition or an another embodiment, the radii ply 100 may include tow or tape placed by components similar to the tensioning device 1004, tow nosepiece 1006, and compaction roller 1008.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A device to place a composite ply, the device comprising:
   a curved form, the form having a curved web surface and a cap surface;
   a plurality of spools to dispense a respective plurality of strips of a composite material, the plurality of spools being configured to dispense the plurality of strips adjacent to one another and oriented in alignment with a longitudinal centerline of the curved web surface;
   a web compaction roller to compact the plurality of strips upon the web surface and generate a web ply; and
   a set of guide rollers to urge directly against the cap surface, wherein the compaction roller is directed along the form by the guide rollers.

2. The device according to claim 1, further comprising:
   a cap compaction roller to place a cap ply upon the cap surface.

3. The device according to claim 2, further comprising:
   a 45° compaction roller disposed at 45° relative to an axis of the web compaction roller to impart compaction force at an interface of the web ply and the cap ply.

4. The device according to claim 3, further comprising:
   a 45° tow placement device disposed at 45° relative to an axis of the web compaction roller to place a radii ply, wherein the 45° compaction roller is configured to compact the radii ply.

5. The device according to claim 2, further comprising:
   a second cap compaction roller to place a second cap ply upon a second cap surface of the form.

6. The device according to claim 1, further comprising:
   a second set of guide rollers to urge against a second cap surface of the form.

7. The device according to claim 1, further comprising:
   a tensioning device to generate sufficient drag tension upon the composite material.

8. The device according to claim 1, further comprising:
   a nosepiece to guide the composite material towards the compaction roller.

9. The device according to claim 8, further comprising:
   a heating element in the nosepiece to impart sufficient heat upon the composite material to improve characteristics of the composite material.

10. A device to place a composite ply, the device comprising:
    a curved form having a longitudinal centerline coinciding with the form, the form comprising:
      a curved web surface;
      a first cap surface; and
      a second cap surface; and
    a ply placement unit configured to place the composite ply on the form, the ply placement unit comprising:
      a plurality of web spools configured to dispense a respective plurality of strips of a composite material adjacent to one another upon the curved web surface, wherein the ply placement unit is configured to place the plurality of strips parallel to the longitudinal centerline;
      a web compaction roller configured to compact the plurality of strips upon the web surface and generate a web ply;
      a first cap spool configured to dispense a first cap ply of the composite material upon the first cap surface, wherein the ply placement unit is configured to place the first cap ply parallel to the longitudinal centerline;
      a first cap compaction roller configured to compact the first cap ply upon the first cap surface;
      a second cap spool configured to dispense a second cap ply of the composite material upon the second cap surface, wherein the ply placement unit is configured to place the second cap ply parallel to the longitudinal centerline;
      a second cap compaction roller configured to compact the second cap ply upon the second cap surface; and
      a set of guide rollers configured to urge directly against the cap surface, wherein the compaction roller is directed along the form by the guide rollers.

11. The device according to claim 10, further comprising:
    a tensioning device configured to generate sufficient drag tension upon the composite material.

12. The device according to claim 10, further comprising:
    a nosepiece configured to guide the composite material towards the web compaction roller.

13. The device according to claim 12, further comprising:
    a heating element in the nosepiece configured to impart sufficient heat upon the composite material to improve characteristics of the composite material.

14. The device according to claim 10, further comprising:
    a first 45° compaction roller disposed at 45° relative to an axis of the web compaction roller to impart compaction force at an interface of the web ply and the first cap ply; and
    a second 45° compaction roller disposed at 45° relative to an axis of the web compaction roller to impart compaction force at an interface of the web ply and the second cap ply.

15. The device according to claim 14, further comprising:
    a first 45° tow placement device disposed at 45° relative to an axis of the web compaction roller to place a first radii ply, wherein the first 45° compaction roller is configured to compact the first radii ply; and
    a second 45° tow placement device disposed at 45° relative to an axis of the web compaction roller to place a second radii ply, wherein the second 45° compaction roller is configured to compact the second radii ply.

* * * * *